United States Patent
Lun et al.

(10) Patent No.: US 12,173,592 B2
(45) Date of Patent: Dec. 24, 2024

(54) THERMAL RECOVERY CONSTRUCTION METHOD

(71) Applicants: CHINA PETROLEUM & CHEMICAL CORPORATION, Beijing (CN); SINOPEC EXPLORATION & PRODUCTION RESEARCH INSTITUTE, Beijing (CN)

(72) Inventors: Zengmin Lun, Beijing (CN); Huanquan Sun, Beijing (CN); Guangfu Wang, Beijing (CN); Bo Hu, Beijing (CN); Lei Tang, Beijing (CN); Yuanliang Yang, Beijing (CN); Jianyong Wang, Beijing (CN); Chengyuan Lv, Beijing (CN); Jianfang Sun, Beijing (CN); Haitao Wang, Beijing (CN); Yanbo Jiang, Beijing (CN); Tao Ma, Beijing (CN)

(73) Assignees: CHINA PETROLEUM & CHEMICAL CORPORATION, Beijing (CN); SINOPEC EXPLORATION & PRODUCTION RESEARCH INSTITUTE, Beijing (CN)

( * ) Notice: Subject to any disclaimer, the term of this patent is extended or adjusted under 35 U.S.C. 154(b) by 169 days.

(21) Appl. No.: 18/002,960

(22) PCT Filed: Oct. 30, 2020

(86) PCT No.: PCT/CN2020/125253
§ 371 (c)(1),
(2) Date: Dec. 22, 2022

(87) PCT Pub. No.: WO2022/000895
PCT Pub. Date: Jan. 6, 2022

(65) Prior Publication Data
US 2023/0258062 A1 Aug. 17, 2023

(30) Foreign Application Priority Data
Jun. 28, 2020 (CN) .......................... 202010596378.8

(51) Int. Cl.
*E21B 43/243* (2006.01)
*E21B 43/295* (2006.01)

(52) U.S. Cl.
CPC .......... *E21B 43/243* (2013.01); *E21B 43/295* (2013.01)

(58) Field of Classification Search
CPC ............................. E21B 43/243; E21B 43/295
See application file for complete search history.

(56) References Cited

U.S. PATENT DOCUMENTS

| 4,018,481 A | 4/1977 | Terry |
| 4,422,505 A | 12/1983 | Collins |

(Continued)

FOREIGN PATENT DOCUMENTS

| CN | 101122227 A | 2/2008 |
| CN | 102071918 A | 5/2011 |

(Continued)

*Primary Examiner* — Giovanna Wright
(74) *Attorney, Agent, or Firm* — NKL Law; Allen Xue

(57) ABSTRACT

A thermal recovery construction method includes the steps of determining design parameters of a current thermal recovery construction according to geological data and reservoir characteristics of a current oil deposit area to be stimulated; preparing, according to the design parameters, coal water slurry required for the current thermal recovery construction; injecting the coal water slurry into a target reservoir through an injection well with an injection mode of the design parameters, along with combustion adjuvant with an amount selected based on a total injection amount of the coal water slurry; and inducing spontaneous combustion of the coal water slurry by thermal energy generated by a downhole heating device, and performing control and dis- (Continued)

placement on the reservoir with the thermal energy and gas generated after the combustion.

10 Claims, 2 Drawing Sheets

(56) References Cited

U.S. PATENT DOCUMENTS

| | | | | |
|---|---|---|---|---|
| 4,458,756 | A | * 7/1984 | Clark | E21B 43/24 |
| | | | | 166/260 |
| 4,580,504 | A | 4/1986 | Beardmore et al. | |
| 7,980,312 | B1 | * 7/2011 | Hill | E21B 43/241 |
| | | | | 166/272.2 |
| 8,869,889 | B2 | * 10/2014 | Palmer | E21B 36/02 |
| | | | | 166/260 |

FOREIGN PATENT DOCUMENTS

| | | | |
|---|---|---|---|
| CN | 102287175 | A | 12/2011 |
| CN | 103422848 | A | 12/2013 |
| CN | 104453817 | A | 3/2015 |
| CN | 107387180 | A | 11/2017 |
| RU | 2109133 | C1 | 4/1998 |
| RU | 2287054 | C1 | 11/2006 |
| WO | 2008033838 | A2 | 3/2008 |

* cited by examiner

THERMAL RECOVERY CONSTRUCTION METHOD

CROSS REFERENCE OF RELATED APPLICATION

This application is a U.S. national stage entry of PCT International Application No. PCT/CN 2020/125253, filed on Oct. 30, 2020, which claims the priority of Chinese patent application No. 202010596378.8, entitled "A thermal recovery construction method" and filed on Jun. 28, 2020, the entire content of which is incorporated herein by reference.

TECHNICAL FIELD

The present invention relates to the technical field of development of oil deposits, in particular to a thermal recovery construction method based on coal water slurry.

TECHNICAL BACKGROUND

Onshore heavy oil reserves in China reach four billion tons. They are mainly developed based on thermal recovery, which has, however, a low overall recovery rate, especially for some oil deposits with small reservoir thickness, high formation pressure, large burial depth, or active edge and bottom water. Thermal recovery is the main way to develop heavy oil. The thermal recovery methods that have been popularized and applied in the industry include hot water flooding, steam huff and puff, steam flooding, fire flooding, SAGD, or the like. No matter what kind of the thermal recovery method is used, it is necessary to generate thermal energy through fuel combustion for use in the thermal recovery technology. In the process of thermal recovery of crude oil, steam is obtained mainly by burning fuels, such as coal, natural gas or the like, through boilers on the ground. The generated steam is injected into the formation through surface pipeline facilities to heat the crude oil and minerals in the formation, so that the viscosity of the crude oil is reduced and the fluidity thereof is enhanced. In this manner, the crude oil can be extracted.

Coal, the fossil energy with the largest reserves and the highest proportion in China, can be used as boiler fuel for power generation and heating. Compared with crude oil, it is more economical and easy to obtain. However, emission and air pollution problems caused by burning coal have restricted the large-scale application of coal in the field of oil exploration and development in future. Oilfield power plants and coal-fired boilers with coal as the main fuel have been gradually shut down or replaced. However, compared with natural gas and other forms of energy, coal is featured by wide distribution, huge reserves, and cheap extraction. Therefore, how to utilize coal resources in a clean and efficient manner is the main way to give full play to the advantages of coal resources. Accordingly, how to realize the clean and efficient utilization of coal resources in the thermal recovery of crude oil is an important way to greatly improve the benefits of heavy oil thermal recovery.

In addition to the emission and pollution problems caused by fuel, different thermal recovery technologies are also subjected to many limitations due to technical characteristics and oil-deposit conditions. The main technical principles and technical characteristics of different thermal recovery technologies are introduced as follows.

1. Steam Huff and Puff Technology for Oil Recovery

Steam huff and puff is a relatively simple and mature technology for heavy oil recovery by steam injection. In steam huff and puff, high-temperature and high-pressure steam is firstly injected into the oil layer to heat the oil layer around the oil well for reducing the viscosity of oil, and then open the well for oil production after soaking and heat exchange. The process of steam huff and puff is generally divided into three steps: steam injection, well soaking, and well opening for production. This process can be carried out cyclically. The main principle of this oil recovery technology is to use steam to heat the crude oil near the wellbore, so as to reduce the viscosity of the crude oil. The steam huff and puff technology has the following advantages. First, the process is simple and quick. Second, the rate of oil production can be improved to greatly increase the yield of crude oil in a short time. Third, investment can be quickly returned, thus improving economic benefits. Fourth, the oil layer can be pre-heated to reduce the pressure of the oil layer through multiple cycles of steam huff and puff, so as to be ready for a next step of steam flooding. However, the steam huff and puff technology has the disadvantages of low recovery rate, periodic change of cooling and heating, and great damages to the wells. Like conventional oil recovery methods, the steam huff and puff technology must rely on natural energy for oil production, so that the recovery rate thereof is generally only 15-20%.

2. Steam Flooding Technology for Oil Recovery

Steam flooding is a development method for heavy oil. In this technology, steam of high dryness is continuously injected from an injection well into the oil layer, so that the oil layer is continuously heated to reduce the viscosity of the crude oil in the formation, and the crude oil is driven to the area around a production well, and finally is extracted to the surface. At present, this technology is the thermal oil recovery technology with the largest scale of application. For oil deposits suitable for steam flooding, the recovery rate thereof can generally be increased to 50-75%. The oil-steam ratio of the steam flooding is generally lower than that of steam huff and puff, so that in the oil deposit it is in fact a combined displacement of steam flooding and hot water flooding to be carried out. Based on this principle, the steam flooding technology for oil recovery can obtain larger sweeping volume and displacement efficiency than the steam huff and puff technology. However, in the practical development, this technology has suffered many common problems as follows: uneven planar displacement, thus generating dead oil zones that are difficult to produce; the upper oil layer has good steam absorption while the lower oil layer has poor steam absorption due to steam overlay, resulting in low degree of utilization of oil and gas reserves; the control for steam injection is inflexible so that the sweeping volume of the steam flooding is limited, which leads to a limited increase in the recovery rate; and so on. In practice, it has been proved that only when the dryness of bottom hole steam is larger than 40%, and the reservoir pressure is lower than 5 MPa or the reservoir pressure drop is larger than 50%, the steam flooding technology for oil recovery can achieve satisfactory results. Therefore, judging from the above standards and most of SINOPEC's oil-deposit conditions, there are many difficulties in implementing the steam flooding technology in many heavy oil deposits, or switching to the steam flooding technology after implementing many cycles of the steam huff and puff technology for oil recovery.

3. SAGD Recovery Technology

SAGD recovery technology proposes to continuously inject steam into the oil layer from a steam injection well. The injected steam overlays upward to form a steam chamber in the formation, the steam chamber moving upward and sideward to exchange heat with the crude oil in the oil layer. The heated crude oil with reduced viscosity and condensed water flow by gravity to a production well. As the crude oil is extracted, the steam chamber gradually expands. The SAGD recovery technology adopts steam as a thermal carrier to heat the oil layer for reducing the viscosity of the crude oil, and uses gravity as the main force for driving the crude oil.

The technical conditions applicable for the SAGD recovery technology are: the continuous thickness of the oil layer is larger than 20 m (or larger than 10 m for a combination of vertical wells and horizontal wells), the viscosity of the crude oil is larger than 10000 mPa·s, the horizontal permeability is larger than 200 md, the ratio of vertical to horizontal permeability is larger than 0.1, the reservoir buried depth is lower than 1000 m, with no continuous distribution of shale interlayers in the oil layer. Due to the above conditions, this technology is restricted for use in the development of heavy oil deposits.

Upon comprehensive analysis of the above thermal recovery technologies, it can reveal that the main factors affecting the thermal recovery efficiency of crude oil includes steam utilization rate, steam dryness, formation heterogeneity, edge and bottom water, and water content, temperature and pressure of the formation, or the like.

The steam utilization rate is mainly affected by on-way heat loss and cap rock heat loss in the formation. First, when the steam generated by a surface boiler is injected into the formation to reach the target reservoir, heat loss will occur along the way to reduce the steam dryness. If the formation is buried too deep and the formation pressure is high, the steam dryness will also be reduced, with the enthalpy of the steam being much higher than that of the hot water. When the dryness is reduced to a certain level, the effect of the steam thermal recovery will be greatly reduced. Therefore, various thermal insulation measures have been taken in the oil fields to reduce the heat loss, such as using high dryness boilers or superheated steam to maintain the dryness. However, these technologies all suffer the problems of high cost and difficult operation.

In addition, various channeling phenomena will occur during the thermal recovery of crude oil. Steam or hot water of high temperature will flow along channels of high permeability, thus reducing the sweeping coefficient and the displacement efficiency. Use of gel or other sealing or anti-channeling measures cannot achieve stable effects on site, although high at cost.

Oil recovery through combustion of oil in-situ, also known as oil recovery through in-situ combustion or fire flooding, is a thermal recovery technology different from steam generation on the ground. The technology of combustion of oil in-situ is carried out through injecting air into the well, and maintaining the crude oil combusted in-situ to drive the crude oil to the production well. Compared with other thermal recovery methods, this technology is extraordinarily advantageous in that the oil layer can be heated in-situ, so that the energy utilization rate and the recovery rate are both high. The technology of combustion of oil in-situ is the earliest thermal recovery technology put in use for heavy oil. About 300 fire-flooding field test projects have been implemented around the world, with 23 projects being still in operation. This technology not only has the advantages of steam injection and hot water flooding, but also has the characteristics of $CO_2$— and $N_2$ flooding, which can supplement the energy of the oil layer and prevent the water-sensitive phenomenon of sensitive oil deposits. However, the main problem of the technology is that it is more suitable for oil deposits with lower viscosity. Therefore, in order to achieve a suitable saturation for the oil layer, the technology of combustion of oil in-situ still has the problems of difficult ignition, difficult underground control, high consumption of crude oil and the like, so that it has not been widely promoted and applied in China.

Moreover, coal-fired boilers used in thermal recovery also have serious defects, such as high energy consumption for steam generation and huge carbon emissions. With the increasing requirements for energy conservation, environmental protection and emission reduction in China, various regions have prohibited and restricted the use of coal-fired boilers.

To sum up, in view of insufficient clean resources, such as natural gas or the like, it is an important technical challenge and also a direction of development in the field of petroleum exploration and exploitation concerning how to make good use of coal, a low-cost and abundant resource to improve the efficiency of clean utilization, and greatly increase the recovery rate of crude oil.

SUMMARY OF THE INVENTION

In order to solve the above technical problems, embodiments of the present invention provide a thermal recovery construction method, comprising: a step of designing construction parameters, wherein construction parameters for a current thermal recovery construction are determined according to geological data and reservoir characteristics of a current oil deposit area to be stimulated; a step of preparing coal water slurry, wherein coal water slurry required for the current thermal recovery construction is prepared according to the construction parameters; a step of injection, wherein the coal water slurry is injected into a target reservoir through an injection well according to an injection mode of the construction parameters, and combustion adjuvant is injected based on a total injection amount of the coal water slurry; and a step of control and displacement, wherein spontaneous combustion of the coal water slurry is induced by thermal energy generated by means of a downhole heating device, and the control and displacement is performed on the reservoir with thermal energy and gas generated after the combustion.

Preferably, the construction parameters include a proportion of each component of the coal water slurry, a median particle size of coal powder, a median particle size of the coal water slurry, a total injection amount of the coal water slurry, and an injection mode of the coal water slurry.

Preferably, the step of designing construction parameters comprises: selecting one or more injection wells for the current thermal recovery construction; determining the proportion of each component of the coal water slurry according to the reservoir characteristics of the current oil deposit area to be stimulated; determining the median particle size of the coal powder and that of the coal water slurry respectively according to pore distribution characteristics of the current oil deposit area to be stimulated; and determining the total injection amount of the coal water slurry according to reservoir thickness, reservoir porosity, reservoir permeability and reservoir saturation of the current oil deposit area to be stimulated, and pattern of injection-production well network.

Preferably, determining the median particle size of the coal powder and that of the coal water slurry respectively according to pore distribution characteristics of the current oil deposit area to be stimulated comprises determining the median particle size of the coal powder according to distribution characteristics of average pore radius of the reservoir and median particle size of pores of the reservoir, wherein the median particle size of the coal water slurry is preferably less than one third of the median particle size of pores of the reservoir.

Preferably, the step of injection comprises: injecting the coal water slurry and the combustion adjuvant into different positions in the reservoir with a preset injection mode, wherein the injection mode is selected from a group consisting of multiple-slug injection, mixed continuous injection and alternating injection.

Preferably, in the step of preparing coal water slurry, dispersant is used as an additive in the coal water slurry.

Preferably, before the step of control and displacement, the method further comprises: placing the heating device in the target reservoir downhole through a pipe string or a wire, and heating the target reservoir after a power supply of the heating device is turned on.

Preferably, the step of injection further comprises injecting clean water to isolate slugs from each other.

Preferably, in the step of control and displacement, crude oil at various positions is dissolved and diffused with the gas generated after the combustion so that displacement is performed on the crude oil, and fractures or channels at different positions are blocked by unburned particles of the coal water slurry deposited in the pores at corresponding positions.

Preferably, in the step of control and displacement, the coal water slurry is injected into different combustion positions in the reservoir through coal water slurry injecting medium, which is selected from one of perforation holes, screen pipe and liner pipe of the target reservoir.

Compared with the prior arts, one or more embodiments of the above technical solutions can provide the following advantages or benefits.

The present invention proposes a thermal recovery construction method based on coal water slurry. Specifically, in the method, based on the characteristics of the target oil deposit, coal powder, water and additive with respective particle size distributions and respective preset proportions are physically processed into coal water slurry. Then, the coal water slurry is injected into the target reservoir through the surface pipeline, the wellhead, the wellbore string and the like, along with a corresponding amount of combustion adjuvant. After the formation is heated by combustion in the reservoir, control and displacement can be performed on the crude oil or heavy oil at different positions in the target reservoir. According to the present invention, coal that is abundant in reserves and low in price is adopted as fuel, and the combustion is transferred from the surface to the reservoir by means of the coal water slurry processing technology, thus bringing about the following main advantages. First, the combustion is carried out inside the reservoir completely, so that the heat loss is almost negligible and the thermal efficiency reaches its highest value. Second, the combustion occurs in the water phase first, which can avoid or prevent the combustion of crude oil. Third, unburned coal particles in the coal water slurry can be controlled in sizes, so that they can play a plugging role in the reservoir, thus improving the sweeping coefficient of the displacement. Fourth, since the viscosity of coal water slurry is much larger than that of water or steam, the sweeping range and the displacement efficiency of the displacement can be further increased. Fifth, the method can be implemented in a single-slug mode or a multiple-slug mode. Sixth, carbon dioxide and nitrogen generated by the combustion can be used for flooding, essentially without pollutants or greenhouse gas emissions. Finally, the method is low at cost and can be readily operated. The method is not only suitable for heavy oil deposits, but also for conventional crude oil deposits. The method is conducive to clean utilization of coal, and can greatly reduce the cost of crude oil thermal recovery and improve the recovery and development efficiency of crude oil through thorough utilization of combustion products. The method is a low-cost, environment-friendly, energy-saving, and high-efficient technology which can enhance the oil recovery rate and has great application prospects.

Other features and advantages of the present invention will be set forth in the description which follows, and in part will be self-evident from the description, or may be learned by implementing the present invention. The objectives and other advantages of the present invention may be realized and attained by the structures or steps particularly pointed out in the description, claims and drawings.

DESCRIPTION OF THE DRAWINGS

The accompanying drawings are used to provide a further understanding of the present invention, and constitute a part of the description. Together with the embodiments of the present invention, the drawings are intended to explain the present invention, rather than constitute any limitation to the present invention. In the drawings.

DETAILED DESCRIPTION OF EMBODIMENTS

Figure 1:
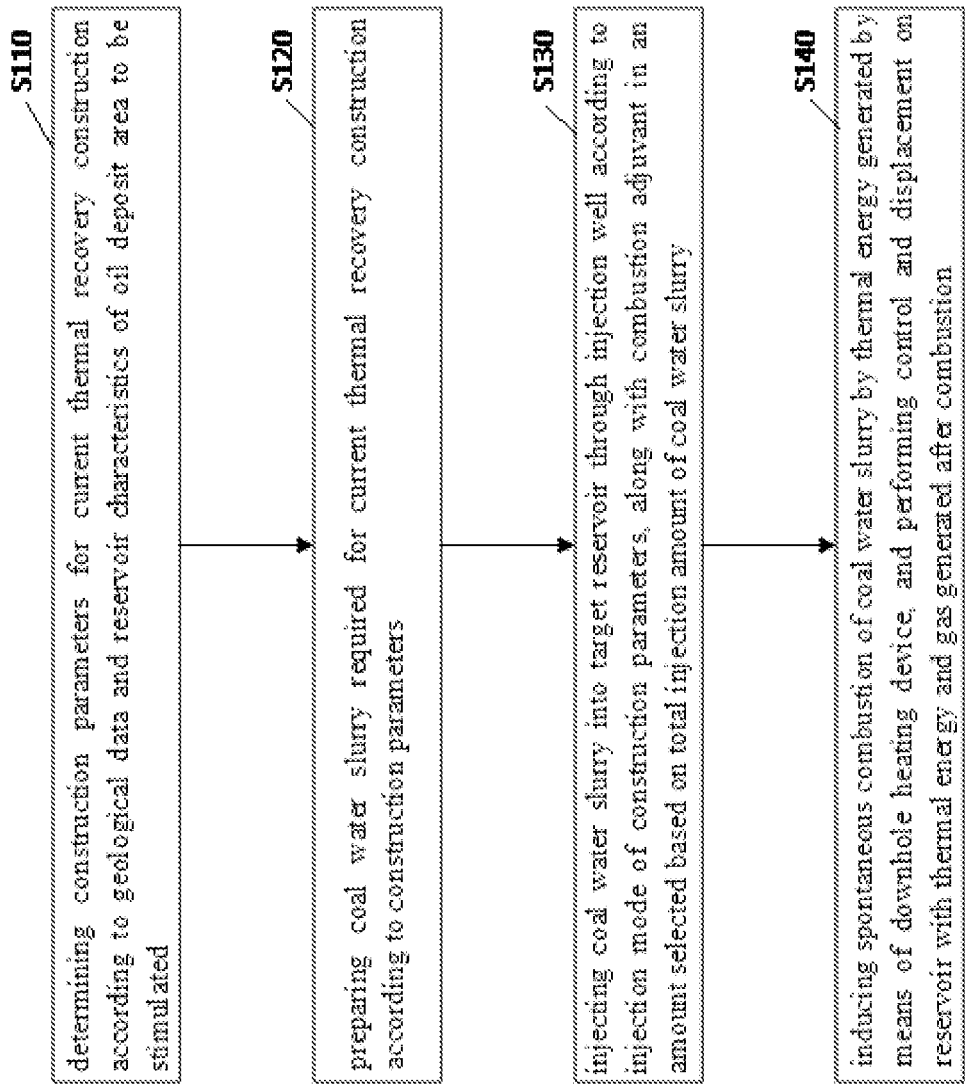
FIG. 1 shows steps of a thermal recovery construction method according to an embodiment of the present application.

In the following the embodiments of the present invention will be described in detail with reference to the accompanying drawings and examples, so that the procedure of how the present invention solves technical problems with technical means and achieves corresponding technical effects can be understood and implemented. It should note that the embodiments of the present application and various features in the embodiments can be combined with each other if there are no conflicts, and the technical solutions formed by such combinations all fall within the scope of protection of the present invention.

In addition, the steps shown in the flow chart of the figures may be performed in a computer system including a set of computer executable instructions, for example. And, although a logical order is shown in the flow chart, in some cases the steps as shown or described may be performed in a different order than here.

Heavy oil reserves in China are about four billion tons, and thermal recovery is one of the main development ways for heavy oil. Thermal recovery mainly includes the oil recovery technology of steam huff and puff, and that of steam flooding, wherein steam is obtained from oil-, coal- or gas-fired boilers. Oil-fired or coal-fired boilers both suffer problems such as high cost, high emissions, serious pollution or the like, and are gradually stopped or restricted in use. Although gas-fired boilers are relatively clean, they still suffer problems such as guaranteed supply in seasons or the like. Moreover, in the process of thermal recovery, there are also other problems caused by heat loss, such as low steam dryness, low thermal efficiency, serious steam channeling or the like, so that the effect of thermal recovery development is negatively influenced.

In order to solve the problems of low displacement efficiency, difficult implementation, high cost, high energy consumption and serious pollution of coal burning in traditional thermal recovery technologies as described above, a thermal recovery construction method based on coal water slurry is proposed according to the present invention. The method can be suitable not only for heavy oil deposits, but also for conventional crude oil deposits. It is mainly based on the principle of injecting coal water slurry into the reservoir for combustion and acting as an oil displacing agent, thereby greatly improving the recovery rate of crude oil. Specifically, coal powder, water and additive with respective particle size distributions and respective preset proportions are physically processed into coal water slurry. Then, the coal water slurry is injected into the target reservoir through the surface pipeline, the wellhead, the wellbore string and the like, along with a corresponding amount of combustion adjuvant. After controlled combustion of the coal water slurry in the reservoir, the formation is heated, and control and displacement is performed on the reservoir.

According to the present invention, the utilization efficiency of coal can be improved, and gas generated by combustion can bring about comprehensive influences, such as dissolution, viscosity reduction, steam flooding and the like. At the same time, coal particles can also block channeling-paths of high permeability, increase the sweeping efficiency, and enhance the oil displacement efficiency. Accordingly, the recovery efficiency of crude oil can be greatly improved. Moreover, in the present invention, cheap coal is used as combustion material, and almost no emissions of pollutants and greenhouse gases will occur during the implementation. Therefore, the present invention proposes a clean mode of coal utilization, indicating huge advantages of environmental protection and energy saving.

Figure 2:
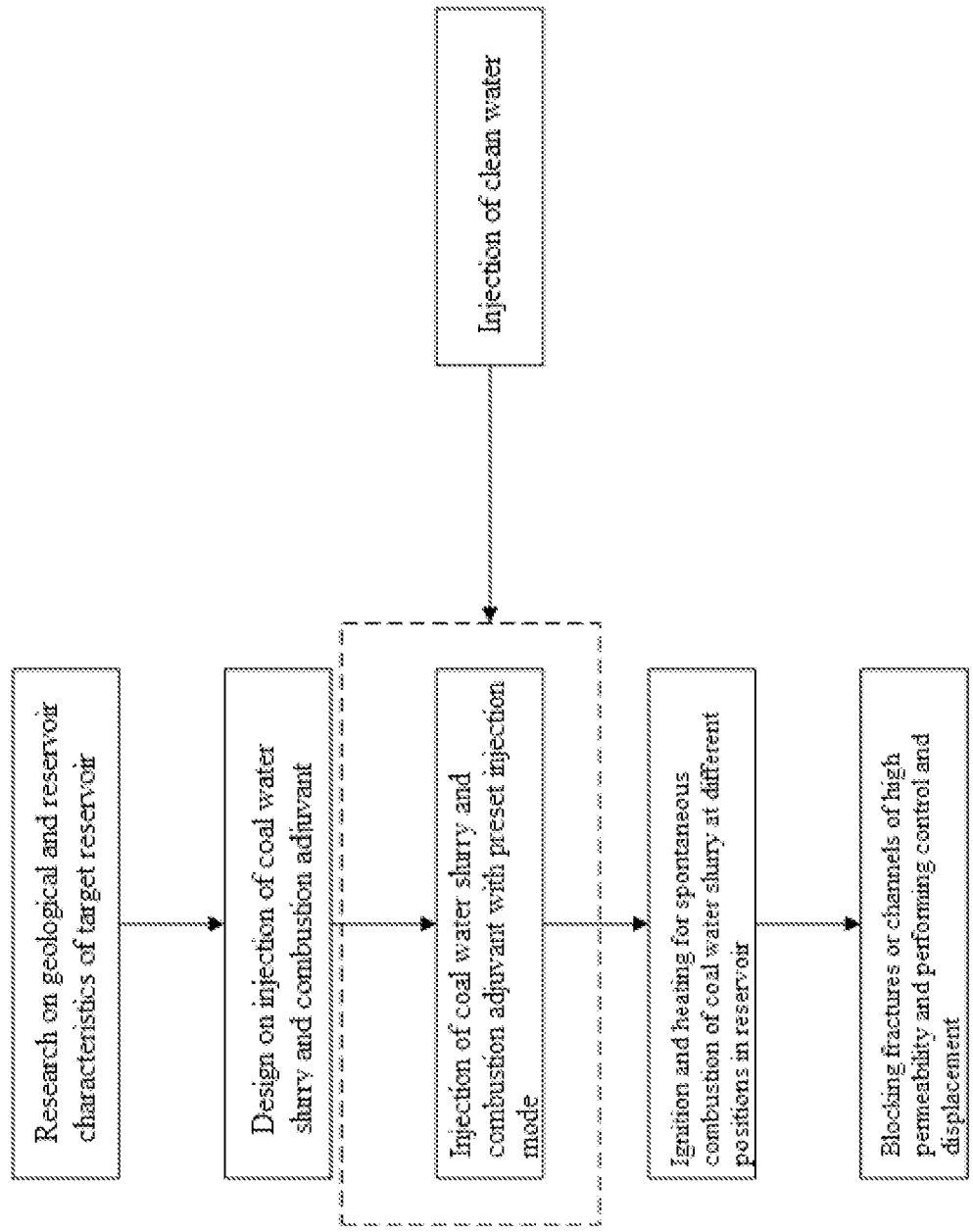
FIG. 2 is a specific flow chart of the thermal recovery construction method according to an embodiment of the present application, wherein a multiple-slug injection mode is adopted.

FIG. 1 shows steps of a thermal recovery construction method according to an embodiment of the present application. FIG. 2 is a specific flow chart of the thermal recovery construction method according to an embodiment of the present application, wherein a multiple-slug injection mode is adopted. In the following the implementing process of the thermal recovery construction method according to the present invention will be described in detail with reference to FIGS. 1 and 2.

In step S110, construction parameters for a current thermal recovery construction are determined according to geological data and reservoir characteristics data of an oil deposit area to be stimulated. In the embodiments of the present invention, the oil deposit area to be stimulated refers to an area that should be treated with the thermal recovery construction to improve the recovery rate of crude oil, wherein the crude oil in this area belongs to one single oil deposit having the same formation characteristic conditions.

In step S110, the geological and reservoir characteristics of the current target reservoir are firstly analyzed and studied according to the geological data and the reservoir characteristic data of the oil deposit area to be stimulated, and then various construction parameters suitable for the current thermal recovery construction are determined. Among others, the construction parameters include, but are not limited to, the proportion of each component of the coal water slurry, the median particle size of coal powder (which refers to the average value of particle diameters of the coal powder), the median particle size of the coal water slurry (which refers to the average value of particle diameters of the coal water slurry), the total injection amount of the coal water slurry, and the mode of injection construction (i.e., injection mode). Further, the components required for preparing the coal water slurry include coal powder, water and additive.

Further, in an embodiment of the present invention, the additive in the coal water slurry is preferably a dispersant. It should note that other additives may also be used in the embodiments of the present invention. The type of additive is not limited in the embodiments of the present invention, and can be selected by one skilled in the art according to actual needs.

Further, when determining the construction parameters required for the current thermal recovery construction, it is necessary to complete the scheme design of the injection procedure of the current thermal recovery construction based on the geological data and the reservoir characteristic data of the current oil deposit area to be stimulated. Specifically, firstly, one or more injection wells are selected for the current thermal recovery construction. In practice, the oil deposit area to be stimulated at least includes one injection well and one production well, or include an injection-production well network formed by multiple injection wells and multiple production wells. The injection well is equipped with an injection pipe string, and an apparatus for preparation of coal water slurry and a pumping apparatus both arranged at the wellhead on the ground. The coal water slurry as prepared is injected into the formation through a coal water slurry pump arranged on the ground. Therefore, in the procedure of selecting the injection well in the embodiments of the present invention, one or more injection wells suitable for the current thermal recovery construction should be selected from the injection wells contained in the current oil deposit area to be stimulated.

Further, after completing the selection of the injection wells, it is necessary to determine the proportion of each component in the coal water slurry according to the analyzed reservoir characteristics of the current oil deposit area to be stimulated, so that the coal water slurry can be suitable for the thermal recovery construction of the oil deposit area to be stimulated. In the embodiments of the present invention, the coal water slurry contains 70% to 29% of coal powder, 29% to 70% of water, and about 1% of additive. It should note that in the present invention the value of content of coal powder in the coal water slurry is not limited, and can be determined by one skilled in the art according to the actual reservoir characteristics of the current oil deposit area to be stimulated.

Further, after determining the proportion of each component of the coal water slurry, it is also necessary to determine the median particle size of the coal powder and that of the coal water slurry, according to the pore distribution characteristics in the current oil deposit area to be stimulated. Specifically, in a preferred embodiment of the present invention, the median particle size of the coal powder is determined based on two factors, namely, the distribution characteristics of the average pore radius of the target reservoir, and the median particle size of pores of the target reservoir. More specifically, in a preferred embodiment of the present invention, the median particle size of the coal water slurry is less than one third of the median particle size of the pores of the target reservoir. In this way, the proportion and the particle size distribution characteristics of each component that are necessary for the preparation of the coal water slurry can be obtained, which are suitable for the current thermal recovery construction. Accordingly, unburned coal particles of the coal water slurry can play a plugging role in the reservoir, thus improving the sweeping coefficient of the displacement.

Further, in an embodiment of the present invention, the total injection amount of the coal water slurry should be determined by various factors. Specifically, the total injection amount of the coal water slurry is determined according to information such as reservoir thickness, porosity, permeability, and saturation of the current oil deposit area to be stimulated, and pattern of the injection-production well network. Thus, in the present invention, the scheme of injection of the coal water slurry and combustion adjuvant can be completed through the above technical procedures, and the method of the present invention then enters into step S120, wherein these parameters as obtained are adopted to implement the thermal recovery construction suitable for the geological and reservoir characteristics of the current oil deposit area to be stimulated.

In Step S120, the coal water slurry required for the current thermal recovery construction is prepared according to the parameters obtained in step S110. Specifically, in step S120, the coal water slurry is prepared by a coal water slurry preparation apparatus through physical processing according to information such as the proportion of each component of the coal water slurry, the median particle size of the coal powder, and the median particle size of the coal water slurry.

In Step S130, the coal water slurry prepared in step S120 is injected through the selected injection well into the target reservoir according to the injection mode in the construction parameters obtained in step S110, wherein a suitable amount of combustion adjuvant is also injected according to the total injection amount of the coal water slurry. The real-time injection amount of the combustion adjuvant is in a suitable proportion of the real-time injection amount of the coal water slurry, so that the proportion can be also satisfied when the coal water slurry and the combustion adjuvant are injected with different injection modes. Furthermore, this proportion is consistent with that of oxygen to coal water slurry for the spontaneous combustion of coal water slurry. In the embodiment of the present invention, the combustion adjuvant is air or oxygen.

In addition, when injecting combustion adjuvant, it is necessary to monitor the total injection amount of the combustion adjuvant in real time, and calculate the oxygen content in the combustion adjuvant, thus ensuring that the total amount of carbon in the coal water slurry is greater than that of oxygen in the combustion adjuvant. Accordingly, it can guarantee that the coal water slurry is excessive for combustion, so that unburned particles of the coal water slurry will be generated and deposited in the pores, thus blocking fractures or channels of high permeability.

Further, in the embodiments of the present invention, a preset injection mode is used to inject the coal water slurry and the combustion adjuvant into different positions in the reservoir for combustion. Preferably, the coal water slurry can be injected in a single slug or multiple slugs. Single-slug injection includes mixed continuous injection and alternating injection. Multiple-slug injection refers to injecting coal water slurry into different slug zones according to the sizes of the slug zones at different positions, and then injecting the combustion adjuvant in an amount sufficient to realize the combustible ratio of the coal water slurry into a corresponding slug zone. Mixed continuous injection means that the coal water slurry is injected first, and then the combustion adjuvant is injected, wherein the injection amount of the coal water slurry and that of the combustion adjuvant are sufficient to induce spontaneous combustion of the coal water slurry. Alternating injection refers to reciprocating a cycle of injecting the coal water slurry first and then injecting the combustion adjuvant for many times, wherein each time the coal water slurry and the combustion adjuvant are injected, the real-time injection amount of the coal water slurry and that of the combustion adjuvant are sufficient to induce spontaneous combustion of the coal water slurry. Therefore, in the present invention, when injecting the coal water slurry and the combustion adjuvant, the mixed continuous injection or the alternating injection can also be used. Alternatively, multiple-slug injection may be used if different slug zones are spaced apart from each other with clean water after combustion, so that a mixture of the coal water slurry and combustion adjuvant exists at different parts of the reservoir. In this way, the energy and gas generated after the spontaneous combustion of the coal water slurry at different positions can be used to improve the sweeping efficiency and the displacement efficiency.

Specifically, in the embodiments of the present invention, the coal water slurry can be injected by means of coal water slurry injecting medium into different combustion positions in the reservoir.

The coal water slurry injecting medium may be selected from one of perforation hole, screen pipe and liner pipe of the target reservoir. That is, the coal water slurry can be injected into the formation of the target reservoir by means of perforation hole, screen pipe and liner pipe of the wellbore in the target reservoir. The concentration of coal particles in the coal water slurry and the sweeping range of the coal water slurry ensure that the coal water slurry has good injectivity and fluidity in the formation. Since the viscosity of coal water slurry is much larger than that of water, the displacement effect and the sweeping coefficient for crude oil can be improved by coal water slurry.

Further, in the embodiments of the present invention, when the multiple-slug injection is adopted, it is necessary to inject clean water into the target reservoir before the end of step S130, so as to isolate the slug zones from each other, thus isolating the combustion reaction in each slug zone.

Therefore, in the present invention, the construction of injecting the coal water slurry and the combustion adjuvant into the target reservoir with a preset injection mode is completed through the above technical procedures, so that the coal water slurry and the combustion adjuvant are mixed at different positions in the reservoir. Then, the method of the present invention enters step S140, wherein the mixture of the coal water slurry and the combustion adjuvant in the reservoir is ignited to complete the construction of control and displacement.

In Step S140, thermal energy generated by a heating device or an ignition device arranged downhole is used to induce spontaneous combustion of the coal water slurry, and the thermal energy and gas generated after the combustion are used to perform control and displacement of the reservoir.

Before step S140 starts, the thermal recovery construction method of the present invention also includes a step of placing the heating device or the ignition device in the downhole target reservoir through a pipe string or a wire, and warming up the target reservoir to heat the formation after the power supply of the heating device or the ignition device is turned on. Therefore, after the formation is heated up, combustion occurs in the presence of the coal water slurry and the combustion adjuvant, so that the temperature in the environment of the downhole target reservoir is changed under the increased temperature of the formation.

In this manner, the thermal energy generated by temperature increment can induce the spontaneous combustion of the coal water slurry.

Further, after the injection is completed in step S130, a mixture of the coal water slurry and combustion adjuvant exists at different positions in the target reservoir. The heating device or the ignition device is powered on to heat up the target reservoir, thus heating the coal water slurry mixed with the combustion adjuvant. When the coal water slurry reaches its temperature for spontaneous combustion, spontaneous combustion of the coal water slurry occurs. The combustion of the coal water slurry will release a large amount of thermal energy to heat the formation fluid and rocks, so that the viscosity of the crude oil in the reservoir bodies at different positions in the formation is reduced, and the formation water is gasified, thereby improving the fluidity of the crude oil. Therefore, in step S140, during the procedure of control and displacement, a large amount of carbon dioxide, nitrogen or other gases released by the spontaneous combustion of the coal water slurry are used to dissolve and diffuse the crude oil at different positions in the reservoir, thus achieving the displacement of the crude oil. Accordingly, the viscosity of crude oil can be further reduced and the displacement effect can be further enhanced.

In addition, fractures or channels of high permeability formed by fracturing at respective positions are blocked by unburned particles of the coal water slurry deposited in the pores at said respective positions. That is, unburned particles of the coal water slurry are deposited in the pores of the formation to reduce the permeability of the formation and block fractures or channels of high permeability, thus preventing the channeling of water and steam.

In the following an example of applying the above-mentioned thermal recovery construction method to a development unit in a heavy oil deposit will be provided. The development unit of the oil deposit has an average burial depth of 500 m, an original reservoir pressure of 4.8 MPa, a formation temperature of 28° C., and a crude oil viscosity of 8,000 mPa·s~35,000 mPa·s. For the current development unit of the oil deposit, a traditional horizontal well steam huff and puff technology has been implemented for more than 10 cycles, with an oil recovery rate of 1.2%, a recovery degree of 8.6% and a composite water cut of 87%. Some production wells have been shut down due to high water cut. For the current development unit, a thermal recovery and flooding scheme with coal water slurry is formulated. The thermal recovery construction process corresponding to this scheme is as follows.

(1) Upon evaluation of geological characteristics and reservoir characteristics of the current oil deposit area to be stimulated, it is found that the average permeability of the oil deposit is 2.4 Darcy, the average porosity is 28.7%, the oil saturation of the original oil deposit is 75%, and the remaining oil saturation of the current oil deposit is 62%. The distribution of the remaining oil in the oil deposit is controlled by the heterogeneity of the oil deposit and the gas channeling of steam huff and puff. There are channels of high water cut and high permeability near the wellbore.

(2) The average pore diameter of the current oil deposit is 112 mm, the maximum pore diameter thereof is 389 mm, and the average pore coordination number is greater than 2.7, which indicates good pore connectivity. In addition, the evaluated thickness of the current oil deposit is 6 m, the structural amplitude of the oil deposit is small, the dip angle of the oil deposit is less than 3 degrees, and there is weak edge water.

(3) The production wells in the current development unit can be converted into horizontal wells, with a determinant well pattern, which also be replaced with a reverse five-point or reverse nine-point well pattern.

(4) The method according to the present invention will be introduced with one injection well and one production well as an example, wherein the well spacing between the injection and production wells is 120 m.

(5) According to results of the above research on the oil deposit, the median particle size of the coal water slurry should be controlled in a range of 16 to 37 μm, and the concentration of the coal water slurry is preferably 69%.

(6) The outlet of a coal water slurry injecting pump is connected to the wellhead, and the wellbore is cleaned with clean water. The coal water slurry is injected into the well at a rate of less than 80 $m^3$ per day. At the same time, the pressure at the wellhead is monitored, and the injection rate is adjusted to ensure the bottom hole pressure is less than the rock fracture pressure. The injection of the coal water slurry is stopped when the total injection amount of the coal water slurry reaches 0.05 PV (pore volume).

(7) After the injection of the coal water slurry is completed, the wellhead and the wellbore are cleaned with clean water. Then, the outlet of an air pump is connected to the wellhead for injection of compressed air.

(8) A heating device is lowered in the wellbore to a center of the reservoir, and is powered on to preheat the reservoir for spontaneous combustion or ignition.

(9) The air is injected continuously, wherein the amount of air injected is converted to the amount of oxygen. The ratio of the coal water slurry amount to the air amount is calculated based on the amount of carbon in the coal and the amount of oxygen in the air. The amount of carbon is greater than the total amount of oxygen, in order to ensure excessive coal water slurry for combustion.

(10) After the coal water slurry is burned, the water in the formation is heated to form steam, which heats the formation and the crude oil, and drives the crude oil to flow to the production well. Unburned coal particles in the coal water slurry are deposited in the pores, causing reduction of rock permeability.

(11) Clean water may be injected to isolate the combustion. The coal water slurry and air can also be injected in cycles to maintain the combustion.

(12) The changes on pressures, temperatures and products in the injection well and the production well are continuously monitored during the injection.

The embodiments of the present invention propose a thermal recovery construction method based on coal water slurry. Aiming at the problems of low thermal efficiency, high cost, serious emissions, and low thermal recovery rate existing in the current thermal recovery technology, this method provides a technology of adopting coal water slurry as both fuel and displacing medium, which can achieve both of high efficiency of coal utilization and high efficiency of crude oil development.

Specifically, according to the characteristics of the target oil deposit and on the basis of oil deposit engineering research, coal powder, water and additive with respective particle size distributions and respective preset proportions are physically processed into coal water slurry. Then, the coal water slurry is injected into the target reservoir through the surface pipeline, the wellhead, the wellbore string and the like, along with a corresponding amount of combustion adjuvant. After the formation is heated by combustion in the reservoir, control and displacement can be performed on the crude oil or heavy oil at different positions in the target reservoir. According to the present invention, the combustion of the coal water slurry can generate a large amount of thermal energy for heating the formation, reducing the viscosity of the crude oil, and improving the fluidity thereof. In addition, unburned coal particles can be deposited in the formation pores for formation control.

According to the present invention, coal that is abundant in reserves and low in price is adopted as fuel, and the combustion is transferred from the surface to the reservoir by means of the coal water slurry processing technology, thus bringing about the following main advantages. First, the combustion is carried out inside the reservoir completely, so that the heat loss is almost negligible and the thermal efficiency reaches its highest value. Second, the combustion occurs in the water phase first, which can avoid or prevent the combustion of crude oil. Third, unburned coal particles in the coal water slurry can be controlled in sizes, so that they can play a plugging role in the reservoir, thus improving the sweeping coefficient of the displacement. Fourth, since the viscosity of coal water slurry is much larger than that of water or steam, the sweeping range and the displacement efficiency of the displacement can be further increased. Fifth, the method can be implemented in a single-slug mode or a multiple-slug mode. Sixth, carbon dioxide and nitrogen generated by the combustion can be used for flooding, essentially without pollutants or greenhouse gas emissions. Finally, the method is low at cost and can be readily operated. The method is not only suitable for heavy oil deposits, but also for conventional crude oil deposits. The method is not only suitable for heavy oil deposits, but also for conventional crude oil deposits. The method is conducive to clean utilization of coal, and can greatly reduce the cost of crude oil thermal recovery through thorough utilization of combustion products. The method is a low-cost, environment-friendly, energy-saving, and high-efficient technology, which can enhance the oil recovery rate and has great application prospects.

The foregoing merely describes preferred embodiments of the present invention, which are not intended to restrict the scope of protection of the present invention. Any modifications or substitutions that can be readily conceived by one skilled in the art based on the technical scope disclosed in the present invention should fall within the scope of protection of the present invention, which, therefore, should be defined by the appended claims.

It should be understood that, the embodiments disclosed in the present invention are not limited by the specific structures, steps or materials disclosed herein, but incorporate equivalent substitutes of these features which are comprehensible to one skilled in the art. It should be also understood that the terms are used herein for describing specific embodiments, rather limiting them.

The phrases "one embodiment" and "embodiments" referred to herein mean that specific features, structures, and characteristics described in combination with the embodiments are included in at least one embodiment of the present invention. Therefore, the phrases "one embodiment" and "embodiments" recited in different parts of the whole description do not necessarily indicate the same embodiment.

Although the embodiments of the present invention are described hereinabove, they are provided merely for better understanding, rather than limiting, the present invention. Without departing from the principles and spirits of the present invention, one skilled in the art can make various modifications and changes on these embodiments. Therefore, the scope of protection of the present invention shall be defined by the appended claims.

The invention claimed is:

1. A thermal recovery construction method, comprising:
a step of designing construction parameters, wherein construction parameters for a current thermal recovery construction are determined according to geological data and reservoir characteristics of a current oil deposit area to be stimulated, wherein the construction parameters include a proportion of each component of the coal water slurry, a median particle size of coal powder, a median particle size of the coal water slurry, a total injection amount of the coal water slurry, and an injection mode of the coal water slurry;
a step of preparing coal water slurry, wherein coal water slurry required for the current thermal recovery construction is prepared according to the construction parameters;
a step of injection, wherein the coal water slurry is injected into a target reservoir through an injection well according to the injection mode of the construction parameters, and a combustion adjuvant is injected based on the total injection amount of the coal water slurry; and
a step of control and displacement, wherein spontaneous combustion of the coal water slurry is induced by thermal energy generated by means of a downhole heating device, and the control and displacement is performed on the reservoir with thermal energy and gas generated by the combustion.

2. The method according to claim 1, wherein the step of designing construction parameters comprises:
selecting one or more injection wells for the current thermal recovery construction;
determining the proportion of each component of the coal water slurry according to the reservoir characteristics of the current oil deposit area to be stimulated;
determining the median particle size of the coal powder and that of the coal water slurry respectively according to pore distribution characteristics of the current oil deposit area to be stimulated; and
determining the total injection amount of the coal water slurry according to reservoir thickness, reservoir porosity, reservoir permeability and reservoir saturation of the current oil deposit area to be stimulated, and pattern of injection-production well network.

3. The method according to claim 2, wherein determining the median particle size of the coal powder and that of the coal water slurry respectively according to pore distribution characteristics of the current oil deposit area to be stimulated comprises determining the median particle size of the coal powder according to distribution characteristics of average pore radius of the reservoir and median particle size of pores of the reservoir.

4. The method according to claim 3, wherein the median particle size of the coal water slurry is less than one third of the median particle size of pores of the reservoir.

5. The method according to claim 1, wherein the step of injection comprises:
injecting the coal water slurry and the combustion adjuvant into a plurality of positions in the reservoir with a preset injection mode, wherein the injection mode is selected from a group consisting of multiple-slug injection, mixed continuous injection, and alternating injection.

6. The method according to claim 5, wherein the step of injection further comprises injecting clean water to isolate slugs from each other.

7. The method according to claim 5, wherein in the step of control and displacement, crude oil in the reservoir is dissolved and diffused with the gas generated by the combustion, and a plurality of fractures or channels at in the reservoir are blocked by unburned particles of the coal powder.

8. The method according to claim 5, wherein in the step of control and displacement, the coal water slurry is injected into a plurality of combustion positions in the reservoir through coal water slurry injecting medium selected from perforation holes, screen pipe, and liner pipe of the target reservoir.

9. The method according to claim 1, wherein the coal water slurry comprises a dispersant.

10. The method according to claim 1, wherein before the step of control and displacement, the method further comprises:

placing the downhole heating device in the target reservoir through a pipe string or a wire, and heating the target reservoir by supplying power to the downhole heating device.

\* \* \* \* \*